US010585941B2

(12) United States Patent
Garrett

(10) Patent No.: US 10,585,941 B2
(45) Date of Patent: Mar. 10, 2020

(54) AUDIO OBJECT SEARCH AND ANALYSIS SYSTEM

(71) Applicant: ACE METRIX, INC., Mountain View, CA (US)

(72) Inventor: Douglas C. Garrett, Santa Monica, CA (US)

(73) Assignee: ACE METRIX, INC., Mountain View, CA (US)

( * ) Notice: Subject to any disclaimer, the term of this patent is extended or adjusted under 35 U.S.C. 154(b) by 305 days.

(21) Appl. No.: 14/447,227

(22) Filed: Jul. 30, 2014

(65) Prior Publication Data

US 2015/0039640 A1     Feb. 5, 2015

Related U.S. Application Data

(60) Provisional application No. 61/860,165, filed on Jul. 30, 2013.

(51) Int. Cl.
*G06F 16/683*     (2019.01)
(52) U.S. Cl.
CPC .................. *G06F 16/683* (2019.01)
(58) Field of Classification Search
CPC ................ G06F 17/14; G06F 16/683
See application file for complete search history.

(56) References Cited

U.S. PATENT DOCUMENTS

2004/0093202 A1*   5/2004   Fischer .............. G06K 9/00523
                                                                      704/216

OTHER PUBLICATIONS

Adiloğlu et al., "A Graphical Representation and Dissimilarity Measure for Basic Everyday Sound Events", 2012.*
Thu, "Music Information Retrieval Algorithm Using Time-Frequency Dictionaries", 2011.*
Kristoffer, "Timbre Models of Musical Sound", 1999.*
Bastiaans, "On the sliding-Window Representation in Digital Signal Processing", 1985.*
Lin et al., "Content-Based Audio Retrieval Based on Gabor Wavelet Filtering", 2005.*
Doktor et al., "Accurate Audio-to-Score Alignment—Data Acquisition in the Context of Computational Musicology", 2012 (Year: 2012).*

* cited by examiner

*Primary Examiner* — Taelor Kim
*Assistant Examiner* — Dawaune A Conyers
(74) *Attorney, Agent, or Firm* — Kwan & Olynick LLP

(57)     ABSTRACT

An audio file is transformed into a Gabor spectrogram. This is used to compare the audio file to a database of audio files, each represented as a Gabor spectrogram. Before two spectrograms are compared, they are aligned. The spectrograms are broken into blocks and individual Gabor vectors in the blocks are compared. Similarities are stored and an aggregate similarity value is derived for the block. After a series of such comparisons and shifting of the secondary spectrogram block, essentially a running window, an offset value is determined. This offset is used to align the two spectrograms at which stage the spectrograms can be compared in a more effective and meaningful manner. A set of observables is derived from the comparisons and the primary spectrogram is classified in way suitable for the application environment.

12 Claims, 5 Drawing Sheets

AUDIO OBJECT SEARCH AND ANALYSIS SYSTEM

CROSS-REFERENCE TO RELATED APPLICATIONS

This application claims priority under U.S.C. § 119(e) to U.S. Provisional Application No. 61/860,165 filed Jul. 30, 2013, entitled AUDIO SIMILARITY AND DEDUPER SYSTEM, hereby incorporated by reference in its entirety.

BACKGROUND OF THE INVENTION

1. Field of the Invention

The present invention relates to audio file representation and processing. More specifically, it relates to creating a representation of an audio file using Gabor vectors and comparing those vectors with the Gabor vectors representing another audio file to determine the degree of similarity between the two audio files and to calculate what are referred to herein as observables.

2. Description of the Related Art

In certain industries, there is often a need to compare an audio file with other audio files in order to evaluate the first file. However, comparing two audio files can be time-consuming, error-prone, and expensive, often requiring human intervention. In one scenario, a company has a database of, for example, 30,000 (or considerably more) audio files that vary in length, generally in the range of 15 seconds to 120 seconds but can be longer. In a typical process, the company receives an audio file from a third-party. The first thing the company needs to do is determine whether it has an audio file that is similar, different, or exactly the same as the sample audio file in its database (leaving open for the moment what it means to be exactly the same or different). One reason to do this is so that the company does not have to replicate analysis of the audio file, that is, essentially repeat work already done. If it is in the database, the audio file has already been studied. Another reason to do this is to determine the degree of similarity between the new file and an existing file in the database (e.g. is one a subset of another?) to detect whether one is a derivative and/or complimentary work of another. This is particularly useful for categorization and attribution of the new audio file.

However, as noted, comparing the audio file to a large number of audio files in a database in a meaningful and accurate way is not a trivial task. Those skilled in the art of audio recording and engineering are aware of the numerous issues that can arise when dealing with the comparison of two or more audio files. Some of the more common ones include two audio signals starting at different times. For example, two audio files may have the same content but one starts after x seconds of silence (or "hiss") and the other starts after y seconds of silence but otherwise the content is the same. There are numerous issues that can arise: 1) when the two files are of vastly different audio quality; 2) one of the files has missing or completely corrupted sections; 3) one of the files has extra audio in the beginning or the end; 4) the two signals have different amplitudes (e.g., the record levels are different such that one plays louder than the other on the same system); 5) one has significantly more noise (hiss, background sound, distortion, etc.) than the other; or 6) any combination of the above. All of these being very common when the same commercial is acquired from two different sources. Comparing the two audio files and arriving at the correct conclusion, that is, that they are the same or that they are meaningfully similar to degree s where s is expressible as a number between zero and one, requires sophisticated processing or human intervention. This is especially important in another typical example in which two audio files are the same except for one, two or just few words (very typical of automotive commercials) that are different. These two audio files should likely be considered duplicates in that any analysis done on one may be used for the other but it should also be made explicit that they are indeed different and by how much. However, if the processing is not intelligent, has insufficient sophistication, uses an insufficiently rich representation, or is overly sensitive to differences that a human would ignore, then even the best "brute force" type algorithm will most likely fail, and they may be regarded as two different audio files. In all of these cases, a simple comparison of the audio files will likely not show that they are duplicates. The processing or comparison would have to be more sophisticated or require manual intervention in order to determine that they are duplicates or near duplicates. Clearly, doing a more sophisticated comparison or one that requires manual intervention on a mass scale (e.g., with 30,000 audio files) would be infeasible in many situations for the company, especially if such comparisons or scans had to be done often.

As noted, one industry or area where such audio comparisons maybe needed is in the advertising field. In one specific area, an advertiser or ad agency has a commercial that it wants tested or evaluated. The commercial has an audio portion which may be comprised of voices, music, sound effects, and so on. The advertiser sends this file to a testing company ("tester") which has a database of audio files of a large number of commercials, all of which have already been tested. Currently, there is no naming convention or standard with respect to commercials (or their audio segments) so comparing the audio files using labels or names to see if there are duplicates is not presently feasible. To save resources and increase efficiency, neither the advertiser nor the tester wants to evaluate a commercial (or nearly the same commercial) twice. The tester needs to determine whether it already has the commercial or something close to it in its database; that is, it wants to know whether there is a duplicate commercial or a near-duplicate commercial. However, as described above, comparing audio files to make this determination, especially in large scale, is a difficult engineering challenge. This is due in part to some of the factors noted earlier, such as timing, small differences in words, noise, and so on. In many cases an advertiser or ad agency may have numerous ads that need to be tested. Having a human watch or listen to each one and determine whether any of the ads already exist in a database is a laborious task and in many cases is not feasible. It is possible to have a machine, such as a computer, listen to them, store an audio representation in the database and make quick audio comparisons to commercials in the database. However, using current technology, comparing audio files of commercials to find duplicates and near-duplicates, does not produce accurate results.

SUMMARY OF THE INVENTION

In one aspect of the present invention, a method of comparing two audio files is described. In one illustration, a primary audio file is received and the tester needs to determine whether that audio file is already present in an audio file storage or database containing a high number of audio files (e.g., 30,000 or more). When two audio files are compared, they may be classified as duplicate, near duplicate or not duplicate.

The comparison begins by creating an accurate and robust representation of the primary audio file. In one embodiment this is done by transforming the audio file into a Gabor representation or Gabor spectrogram. The audio files in the database which the primary audio file will be compared to are also in Gabor representation form. Before the spectrograms are compared or scanned, they are aligned. The Gabor spectrogram (of the first audio file) is broken into blocks. The number of blocks will depend on the length of the audio file. In one embodiment each block is a chain of n Gabor vectors (e.g., 20). A block is compared to a block from the secondary spectrogram, also having n Gabor vectors. The first Gabor vector in the block is compared to a corresponding Gabor vector in the secondary spectrogram. A similarity value is derived from this comparison. For each block there are n similarities. These n similarities are aggregated to a similarity for the entire block and this similarity is stored. The same block from the primary spectrogram is then compared to the next block in the secondary spectrogram, the next block also consisting of n Gabor vectors but shifted over one. In this manner the primary spectrogram block is compared to a running window of n Gabor vectors from the secondary spectrogram. All the aggregate similarity values are stored and a histogram is created. An offset or delta is derived from the highest number of aggregate similarity values. This offset is used to align the primary and secondary spectrograms.

Once the spectrograms are aligned, they can be compared to determine how similar they are. This can be done by executing a scan between the first spectrogram and the secondary spectrogram. Observables can then be derived from the scan, such as average, minimum, maximum, and standard deviation of the similarity, as well as other observables which may be derived from the offset histogram. From these observables the spectrograms may be classified in any suitable manner, such as duplicate, near duplicate, or not duplicate.

BRIEF DESCRIPTION OF THE DRAWINGS

References are made to the accompanying drawings, which form a part of the description and in which are shown, by way of illustration, specific embodiments of the present invention.

DETAILED DESCRIPTION OF THE INVENTION

Figure 1:
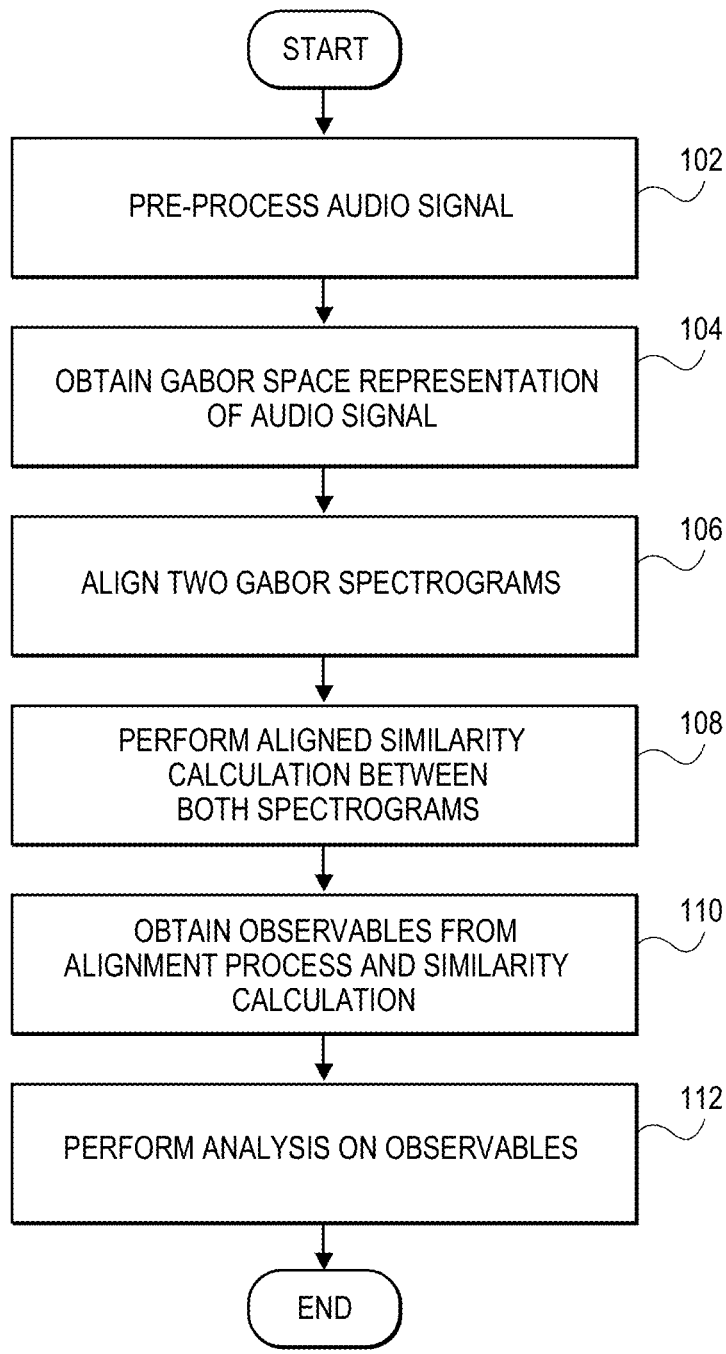
FIG. 1 is a flow diagram showing a high level view of the audio file comparison process in accordance with one embodiment.

Example embodiments of an audio scanning and comparing system are described in the various figures. These examples and embodiments are provided solely to add context and aid in the understanding of the invention. Thus, it will be apparent to one skilled in the art that the present invention may be practiced without some or all of the specific details described herein. In other instances, well-known concepts have not been described in detail in order to avoid unnecessarily obscuring the present invention. Other applications and examples are possible, such that the following examples, illustrations, and contexts should not be taken as definitive or limiting either in scope or setting. Although these embodiments are described in sufficient detail to enable one skilled in the art to practice the invention, these examples, illustrations, and contexts are not limiting, and other embodiments may be used and changes may be made without departing from the spirit and scope of the invention.

In one aspect of the present invention, methods and systems for efficiently and accurately searching a database of audio file, in one embodiment audio representations of commercials, are described. The top matches from the database are examined more closely to determine which of them are, in one embodiment, duplicates, near-duplicates or different from the sample commercial given to the tester. It is helpful to note here that even among the top matches from the quick search, there may be some that are different from the sample audio file (i.e., not same). In one embodiment, this may be quite common in that the first stage always returns the top matches without regard to how good a match they are; they are the "best" only in a relative sense. Thus, in one embodiment, the top matches can be further categorized on an absolute scale as duplicate, near duplicate, or not duplicate.

As is known in the field of artificial intelligence and pattern recognition, it is important to start with an accurate and robust representation of the sample audio of the commercial. In one embodiment, this representation is a Gabor feature space. This may be obtained by taking a convolution of the entire audio signal with a set of Gabor kernels. The Gabor representation is a particularly rich and robust representation, making it an ideal space into which one can decompose an audio signal. It can be described loosely as a local Fourier transform. The Gabor transform kernel is the Fourier transform kernel modulated by a Gaussian envelope centered at a particular time. Each kernel is applied to the entire audio signal resulting in a single complex number (the transform co-efficient magnitude and phase, often only magnitude is used) at each time. This already has an advantage over a simple FFT algorithm in that the Gabor transform converts a signal into frequency space but the Gaussian envelope restricts the transform such that it is centered at a particular time. In this way one gets the power (the square of the transform co-efficient) at a certain frequency and at a certain time. A simple FFT would give one the frequency power but this will be summed over all times, thus hiding the information about when a particular event occurred.

A set of Gabor kernels will yield a particular Gabor feature space when used in the convolution of the audio signal. A Gabor feature space is shown below ("Gabor Representation"). This means that an audio signal which is initially represented as a single number at each given time will be converted into an array of Gabor transform co-efficients at each time (a(t) becomes J(t)). The Gabor kernel set can be determined by taking a family of self-similar kernels that span the entire space of audio signals. This means that the kernels must cover the range of human hearing and be able to represent the audio in a loss-less way. One way to do this is to use n different frequencies, or the corresponding angular frequencies omegas that are sufficiently and strategically distributed across the full frequency range (recall, $\omega=2\pi f$). In this example, $2\pi f$ is the center. This Gabor space works well when making audio comparisons or measuring similarities (15 to 20 kHz in ½ octave increments). In one embodiment, 21 omegas are used. This represents a Gabor transform representing an audio vector J(t), an entire audio signal is transformed into a set of jets {J(t)}, one jet for every time increment from the beginning of the file to the end (see formulas 1, 2 and 3 below). This results in a robust representation of the sample audio signal of the commercial.

In the above embodiment an audio signal is transformed into a Gabor-based spectrogram (the full set of vectors). This makes it easier to meaningfully compare two signals by comparing their respective constituent jets. This requires a well-defined metric for the similarity between two vectors. In one embodiment, this is the cosine of the angle between the unit vector jets in order to determine how parallel are they; the lengths are typically ignored. The jet comparison is normalized in this sense by using the dot product between the unit jets (each jet is divided by its magnitude). The goal is to measure the angle between the two jets in this high dimensional Gabor space, the more parallel they are the more similar they are considered to be. Thus, two audio vectors that are the same, where one is recorded at a low volume and another at a louder volume, would be considered different if the vectors were not normalized and vector length was taken into consideration. In the described embodiment, the similarity of two audio jets is the dot product of the unit vectors.

However, one problem that arises is when two audio files have different and arbitrary start times, t1 and t2, which can lead to inaccurate results. There is nearly always an offset between when signals in the files begin. Two audio files may be duplicates but have different offsets which would make them appear different, solely because of the different offsets between file start time and signal start time since such files are cut differently by humans. They should not be compared as if the start times for each actually match. In other words, the audio representations need to be aligned. This alignment is described in detail below. If they are not aligned, they will always result in a poor match because of the offset, even if the offset is minor, e.g., a few seconds. However, the duplication classification problem cannot be solved simply by shifting the signal in one file by the offset amount. That is, taking the difference in time and shifting one file the offset amount so that the signal starts at the same time in both files will not solve the problem of determining whether or not two audio files are duplicates or not; it simply prepares the files for the next step in the analysis. Once the audio representations are aligned then all the points in one spectrogram can be compared to all the corresponding points in the other spectrogram with meaningful and accurate results.

Thus, in one aspect of the invention, the system aligns two audio files before a comparison is made. After they are aligned, each point in time in one spectrogram is compared to its corresponding point in time in the other. It would be desirable to obtain as strong a signal as possible so that when two duplicate files are compared and one has poor audio quality and the other is clean, the comparison does not result in a no-match because of the difference in audio quality. It would be preferable to have a system where comparing two such audio files resulted in a match which can subsequently be classified correctly and with confidence.

Figure 4:
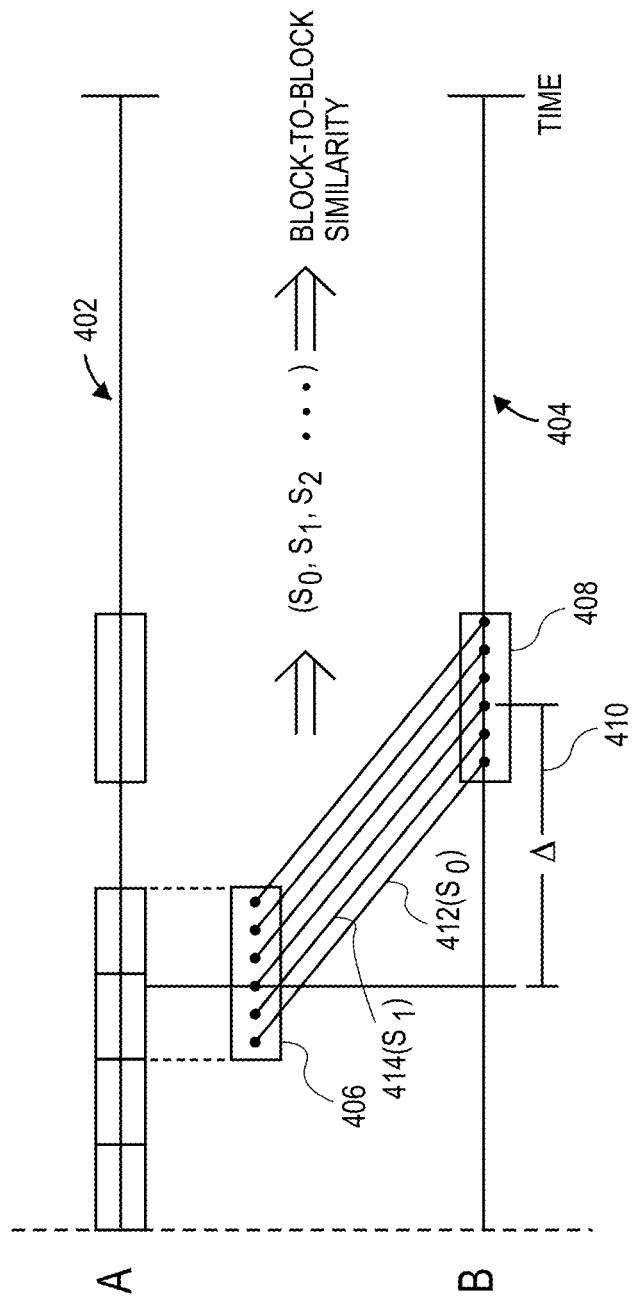
FIG. 4 is a diagram showing comparison of individual Gabor vectors between two blocks in accordance with one embodiment.

In one embodiment, an audio file is broken up into N blocks. A block being a set of Gabor vectors as shown in FIG. 4 below. The intention here is to take a small section from one audio signal and find where it has the highest similarity in the other audio signal. For example, one can take a 3-second block centered at 13.6 seconds from the beginning of audio signal 0 in FIG. 4. This section can then be compared to every possible 3-second block from audio signal 1 (from the beginning to the end). If the 3-second block from signal 0 finds its maximum similarity, for example at 12.3 seconds from the beginning of signal 1, then the offset $\delta$ (or shift) for this particular section of signal 0 will be 12.3−13.6=−1.3 seconds. This is repeated for each of the N blocks of audio signal 0, each one giving another independent measurement of the offset. This procedure is effective even when the audio signals have a low signal-to-noise ratio in that the maximum similarity may actually be relatively low, but if all or most of the N blocks agree on the offset, then the alignment can be accepted with high confidence, thus increasing the effective signal-to-noise ratio. The similarity alone would be too low to indicate a match but the agreement of the deltas/offsets would be a strong indication. Additionally, as shown below, this agreement is also a powerful indication that the two audio signals are indeed duplicates, near duplicates or different or, more generally, how much of one signal is contained in the other.

The system has now attained the best possible global alignment and can proceed to evaluate additional metrics that only make sense once an alignment is made. Furthermore, the system can now analyze the alignment itself and report on the degree of confidence that the alignment was successful and makes sense (e.g., by computing the entropy, peak, variance or other higher moments of the delta histogram).

The process of one embodiment can be summarized as comprising the following steps. Gabor transforms are performed on an audio signal resulting in a Gabor spectrogram representing the amplitude as a function of frequency and time (the amplitude and phase may also be used as a function of frequency and time). Then the spectrogram of one is cut into blocks, compared to blocks of the other, and used to compute a best offset for each section. These offsets are then analyzed to yield a single best global offset to be used in the global alignment. At this stage, the two signals are ready for obtaining observables (i.e., similarity as function of time s(t)).

In one embodiment, the next step is retrieving observables from the alignment data and the similarity vs. time curve s(t). One of the main reasons for the alignment stage is to use the aligned spectrograms to compute s(t), referred to as the deduper stage. For example, what is the probability distribution for the average similarity <s(t)> between two aligned sets of vectors given that they are near duplicates? The values of an array of observables are computed. These observables may include the average, min, max and standard deviation of s(t). Also, from the alignment stage entropy, variance and peak of the offset histogram can be included. That is, the system now has observables (data), so it can proceed to analyze these data and what they mean with respect to class (e.g., duplicate, near duplicate, or different) membership.

At this stage, the system can be trained to recognize certain classes. In the embodiment where audio files of commercials are compared, the classes may be duplicate, near duplicate, and not duplicate, based on statistics. The system can be trained using very few examples (e.g., a production system may be trained on about 30 pairs of commercials) where an example is a pair of audio files from commercials. As known to a person of ordinary skill in the art, this is a very low number of samples for training a pattern recognition system compared to, for instance, some of the common facial or visual recognition systems (e.g., Viola-Jones) which may use hundreds of thousands of samples or more.

One of the goals of the present invention is to compute or construct likelihoods (e.g., how many pairs of duplicate commercials have a specific value of $<s(t)>$ that is between 0.85 and 0.90, how many have the value between 0.9 and 0.95, and so on), pool them through the construction of a Bayesian posterior distribution and train the system to recognize specific classes. In this manner, the system can calculate the probability of class membership for each class based on an array of measurable values. For example, a high minimum similarity indicates a high probability of a duplicate and low probability that they are different and a low maximum similarity strongly suggests a non-duplicate (different).

Returning to the first step of selecting a Gabor feature space (via a set of Gabor kernels) as the representation of the audio file, if this is done well and the feature space is robust, then the need for sophisticated statistics for training the system decreases. In practice this means that one may not need sophisticated modeling techniques in order to accurately model the likelihoods, they often end up as singly peaked distribution functions. In the described embodiment, the goal is to determine whether a pair of audio files is in a duplicate, near-duplicate or non-duplicate class. The system generalizes so it is not mislead by noise (some commercial recordings that the tester receives may have very poor audio quality). At the same time the system can be very precise in detecting small differences, such as differences in one or two words, which would qualify as a near-duplicate. This is a highly sophisticated feature for any pattern matching system.

To summarize, the first step is to obtain a set of Gabor space feature vectors for an audio file at full resolution (loss-less). Then this spectrogram is down sampled in time and is stored for quick comparison. It is important to note here that one cannot down sample then convert to Gabor space as this will severely limit the frequency range of the audio, one must transform to Gabor space and then down sample. The order in which these steps are done is important. Over time, a large number of these down-sampled versions are stored. For example, the tester, as noted, may have a database of 30,000 or more down-sampled versions of audio files for ads. When the tester receives a new ad, it can do a quick scan across all the samples. The alignment, including breaking the file into blocks (sections) and making similarity calculations occur after the quick scan from which the top matches are initially selected and are performed on spectrograms of much fuller resolution (even full resolution if the system is powerful enough to complete the procedure in short enough time).

FIG. 1 is a flow diagram showing a high-level view of an audio file scanning and comparison process in accordance with one embodiment. At step 102 an audio signal is pre-processed where the audio is normalized and scanned to determine beginning and ending silence. At step 104 a Gabor space representation (Gabor spectrogram) is obtained. A Gabor spectrogram provides an excellent representation of an audio signal which, in turn, enables the powerful and efficient audio comparison and analysis system of the present invention.

Figure 2:
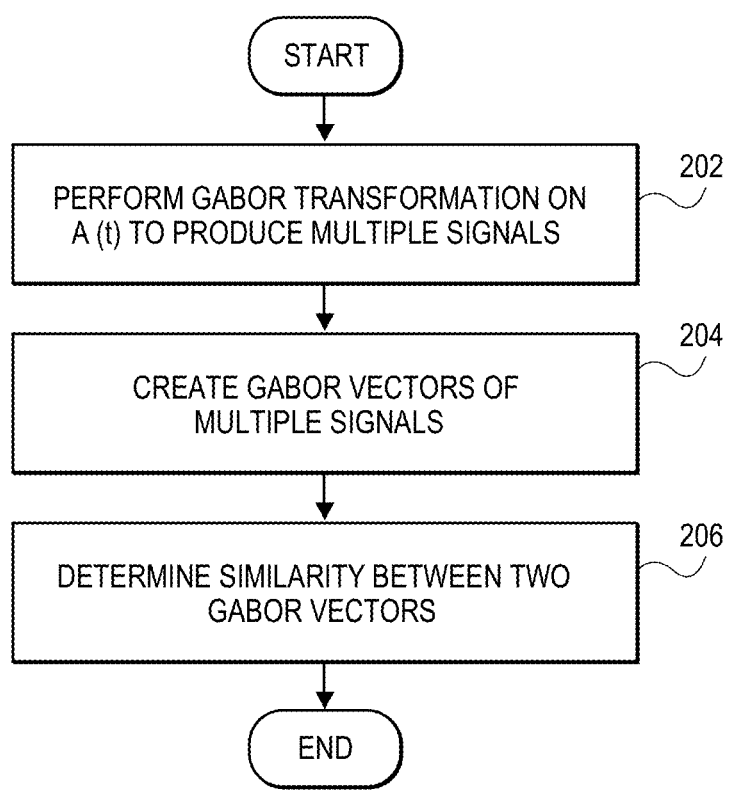
FIG. 2 is a flow diagram of a process of obtaining a suitable and accurate representation of an audio file in accordance with one embodiment.

At step 106 two audio signals are aligned, a step described in greater detail in FIG. 2 and FIG. 4. In this step one of the factors established is which parts of each signal should be compared. As shown below, one of the factors this involves computing a delta or shift and a scaling factor. This shift or translation can be calculated by breaking one of the audio signals into blocks or parts and attempting to find where each part should map to on the other audio file.

Once an alignment is made, at step 108 a similarity calculation is performed yielding s(t) where a single t is used because the files have been aligned, otherwise one would have to write s(t,t') for the similarity between audio file A at time t and audio file B at time t'. In one embodiment, similarity between two audio files at a specific time t may be defined as the cosine of the angle between them, typically computed as a normalized dot product, where the similarity between the complete files can be calculated as an average of s(t) over all t usually written as $<s(t)>$.

At step 110 a set of observables (data) is derived from the complete Gabor-based similarity, such observables may include an average, an average cluster similarity, a maximum similarity, a minimum similarity, and a standard deviation. The delta or offset derived during alignment step 106 may be used to derive an entropy value, a variance, and a peak. Finally, at step 112 an analysis may be performed where results of the similarity scan, observables, and other data from the previous steps may be input into a Bayesian classifier. A Naïve Bayes rule can be used to construct a systematic procedure for combining evidence of the comparison provided by the observables. In the described embodiment, the analysis is used to classify two audio files as duplicate, near duplicate or different.

FIG. 2 is a flow diagram of a process of obtaining a suitable and accurate representation of an audio file in accordance with one embodiment. In the described embodiment the representation used is a Gabor spectrogram. At step 202 a one-dimensional audio signal shown as a(t) is transformed using a Gabor transformation via pre-determined kernels. In one embodiment, there are 20 kernels, spaced at half octave intervals and spanning the range of human hearing. The audio file is transformed by computing the convolution of the signal with a set of Gabor kernels. Thus, a(t) becomes 20 signals, $a^0(t)$, $a^1(t)$, $a^2(t)$ ... $a^{19}(t)$, each representing a Gaussian frequency band, collectively a Gabor spectrogram representing a vector of values at a particular time. If the kernels are set appropriately (e.g., setting the Gaussian envelopes such that adjacent bands overlap), this transformation is a complete (loss-less, and usually over-complete) transformation of the data in the audio file. In other embodiments, the kernels may be selected based on different criteria. At step 204 the 20 signals are transformed into an array of n Gabor vectors, each one representing the signal at time t and composed of the coefficients of the 20 convolutions mentioned above, where r(t) (sometimes written as J(t)) is a Gabor vector of all values at time t. At step 206 a similarity value is derived by comparing r(t) with another Gabor vector representation of different audio file, r'(t) (e.g., from a database of commercial audio files). As described above, transforming both audio files so that they are represented by Gabor vectors is an efficient and effective way of comparing two audio signals. However, before the audio signals can be compared to determine similarity, they need to be aligned. In the described embodiment, this means aligning two Gabor spectrograms.

Figure 3:
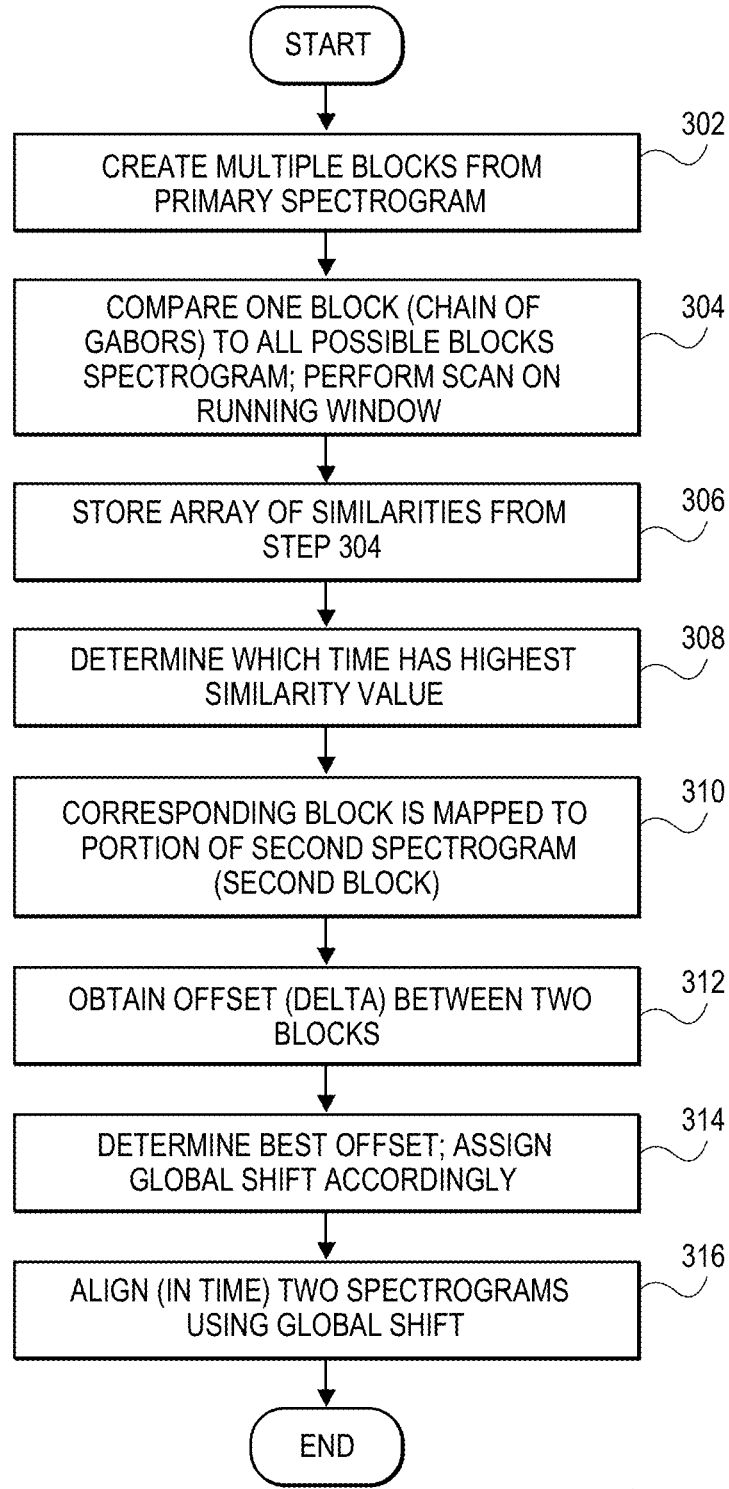
FIG. 3 is a flow diagram of a process of aligning two Gabor spectrograms in accordance with one embodiment.

FIG. 3 is a flow diagram of a process of aligning two Gabor spectrograms in accordance with one embodiment.

As described below, this process involves the comparing of pairs of blocks, one from each of the two audio files. The similarity between the two blocks is calculated as the integration (or aggregation) of similarity values resulting from a chain of Gabor vectors representing one of the blocks centered at time t and a chain of Gabor vectors representing the other block centered at time t' (step 308). At step 302 one of the Gabor spectrograms is broken into blocks, in one embodiment this would yield the values $t_i$=i*dt where i is an integer running from 0 to some $i_{max}$ and dt is an arbitrary displacement. In one embodiment, the blocks are slightly overlapping (in the above embodiment this would mean dt<length of block) and can be created arbitrarily (or not exact).

At step 304 a similarity scan is performed as a running window on the secondary spectrogram, this window would be of the same size as the primary block (same number of Gabor vectors). In other words, a block, comprised of a chain of Gabor vectors from the primary spectrogram, is compared to all possible blocks of this same size from the other spectrogram. This comparison is illustrated in FIG. 4. Each vector in a primary block is compared to its corresponding vector in the secondary block, with the resulting similarities being aggregated into a single similarity representing the similarity of this particular block-to-block comparison. When the comparison is complete for that particular primary block (this means the block centered at time t in the primary has been compared to all possible block times t' in the secondary spectrogram), the next block from the primary is compared to all possible blocks of the secondary (in the above embodiment this would mean $t_i$ goes to $t_{i+1}$ and that t' again spans 0<=t'<=t' max). This then results in an array of similarities that represent the similarity of a specific primary block to all possible blocks in the second spectrogram and there is one such array for each of the primary blocks.

At step 306 the system stores a similarity value for each of the block-to-block comparisons between the primary and the secondary spectrogram. In one embodiment the similarity values for each primary block are stored in an array of similarities for a given time t', $S(t_i,t')$. That is, for a primary block centered at t there is an array of similarities for all times t' on the secondary spectrogram, the idea being that the most likely match for the primary block in the second spectrogram would be at the location t' that has the highest block-to-block similarity value (step 310). At this step the system is essentially trying to determine if the pattern represented by the Gabor vectors of the primary block (the smaller one) can be found anywhere (t' ranges over all possible values) in the secondary spectrogram by looking at all possible chains of Gabor vectors in the second spectrogram, with the only limitation that the blocks being compared are of the same length (or same number of Gabor vectors). This is done for each primary block without any dependency on other blocks in the primary spectrogram. This means that the results of one block from the primary do not influence the results from the other primary blocks, this importance will be realized in the statistical relevance of later calculations.

As mentioned above, at step 308 the system determines which time, t', has the highest similarity value, $S(t_i,t')$, which is the similarity between the block on the primary spectrogram at $t_i$ and the block on the secondary spectrogram at t'. This similarity value may not be high in absolute terms, in other words, a human listening to that portion of audio in the two files may not think they are similar, but is the highest (or most similar) relative to similarity values at all other times in the spectrogram. At step 310 the system maps the primary block to the secondary block with the highest similarity, $S(t_i,t')$. The system finds the portion of the secondary audio file that most closely matches the considered portion of the primary audio file.

At step 312 the system calculates an offset between the two blocks. In one embodiment, it measures the difference in time between the beginning (or center or any consistent reference point) of the primary block and the beginning of the block in the secondary spectrogram that has the highest S value from step 310. Note that the beginning of the primary block may be before or after the beginning of the secondary block. This delta or offset may be measured in milliseconds, seconds or any other suitable unit of time.

At step 314, multiple offsets or deltas are stored, one for each block in the primary spectrogram. Thus, an offset is calculated multiple times. After the last primary block is compared to the second spectrogram, the system will compute a histogram of the offsets. This histogram can be used to determine a best global shift to apply to the entire audio file. In one embodiment, the peak of this histogram will yield the winning offset. If one considers that each primary block is essentially voting for the offset value that it likes the most (highest $S(t_i,t')$ for that block at $t_i$) then this method chooses as a global offset the one that has the most votes (winner-take-all). This becomes the offset that is used as a global shift. This winner-take-all outcome is better suited than the expectation to account for a global shift. This can be easily seen from an example where the histogram has two (or more) distinct peaks that are separated by a large amount of time. One should not take the expectation as that would result in an offset that has fewer votes than the two offsets corresponding to the two peaks.

At step 316 the winning offset is used to align the spectrograms with respect to time. One of the two audio files has been shifted so that audio signal portions of both files are aligned. In the case of exact duplicates this would mean they start at the same time. In a simple example of exact duplicates, if the primary audio file starts 5 seconds after the secondary audio file (the larger one), then the audio in the secondary audio file may be delayed by 5 seconds. In this manner, the audio portions in both files start at the same time, given that they are now both aligned. By following this procedure (i.e., aligning the audio files), even if one file has significant noise but is otherwise very similar to another file, the system will "get past" the noise and conclude that the files are similar. It can do this because the system determines that the global shift that aligns the files has a very high percentage of votes in the winner-take-all procedure and that this can only occur if they are indeed composed of mostly the same audio material. As noted, only after the audio files have been aligned, can the most meaningful similarity be performed, as described in FIG. 2. From the aligned similarity measurement above numerous useful metrics can be computed and certain metrics can be computed (average similarity, maximum and minimum similarity, standard deviation) during alignment process, such as entropy and entropy-related metrics from a histogram of the offsets.

During analysis of the similarity-related data, also referred to as metrics or observables, the final stage in the process, a Naïve Bayes analysis can be performed. The observables can be used to classify two audio files as, for example, duplicate (D), near duplicate (ND), or not duplicate (N), or into any number of classes defined through examples of those classes. If the minimum similarity is high, then the two audio files are likely duplicates. If the maximum similarity is low, then they are likely not duplicates. Standard deviation can also be used to measure similarity.

FIG. 4 is a graph illustrating a process of performing a block-by-block comparison in accordance with one embodiment. Shown are two time lines 402 and 404, A and B, each representing an audio signal. Audio signal B may be referred to as the primary audio file and A as the secondary audio file. A block 408 from audio file B is comprised of multiple Gabor vectors, shown as dots. A block 406 from audio file A is also comprised of Gabor vectors also shown as dots and is referred to as the running window described above. Block 408 is compared to block 406 (i.e., the running window) in A so that block 408 is compared to each possible block 406 in A. The comparison consists of comparing a Gabor vector (from the chain of Gabor vectors in block 408) to each of the Gabor vectors comprising block 406. These are shown by lines 412, 414, and so on. Each of these discrete Gabor vector comparisons leads to a similarity, shown as $S_0$, $S_1$, and so on. The aggregate of these similarities leads to a total block-by-block similarity value. The offset or delta in this illustration is shown as line 410.

Figure 5A:
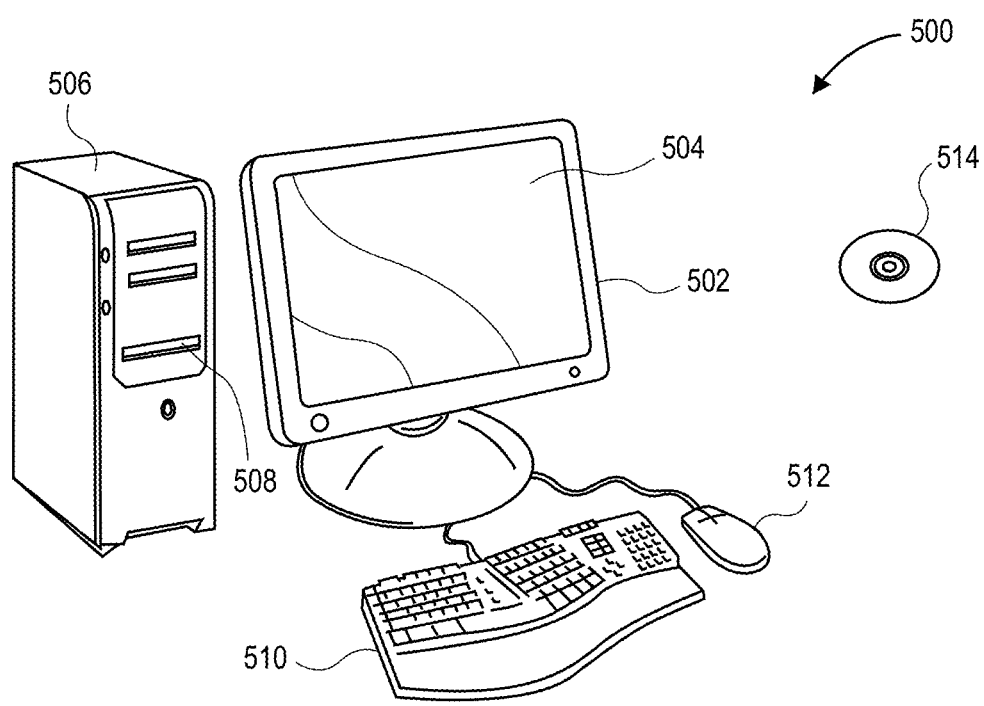
FIGS. 5A and 5B are block diagrams of a computing system suitable for implementing various embodiments of the present invention.
Figure 5B:
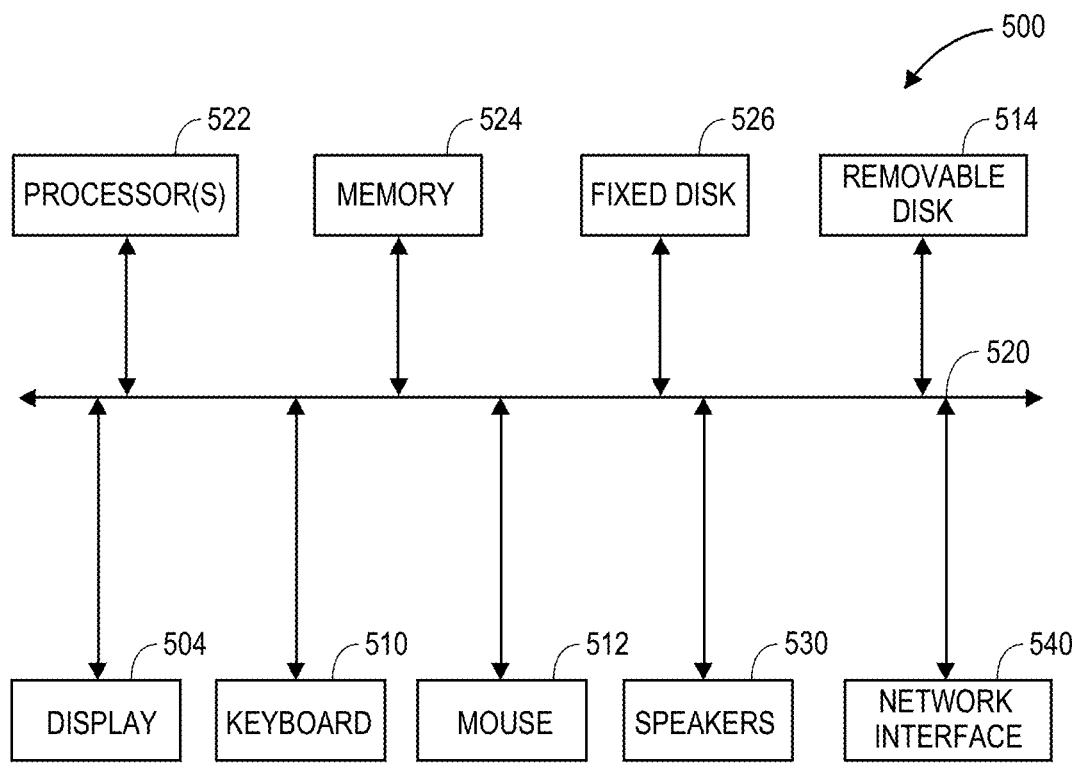

FIGS. 5A and 5B illustrate a computing system 500 suitable for implementing embodiments of the present invention. FIG. 5A shows one possible physical form of the computing system. Of course, the computing system may have many physical forms including an integrated circuit, a printed circuit board, a small handheld device (such as a mobile telephone, handset or PDA), a personal computer or a super computer. Computing system 500 includes a monitor 502, a display 504, a housing 506, a disk drive 508, a keyboard 510 and a mouse 512. Disk 514 is a computer-readable medium used to transfer data to and from computer system 500.

FIG. 5B is an example of a block diagram for computing system 500. Attached to system bus 520 are a wide variety of subsystems. Processor(s) 522 (also referred to as central processing units, or CPUs) are coupled to storage devices including memory 524. Memory 524 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 526 is also coupled bi-directionally to CPU 522; it provides additional data storage capacity and may also include any of the computer-readable media described below. Fixed disk 526 may be used to store programs, data and the like and is typically a secondary storage medium (such as a hard disk) that is slower than primary storage. It will be appreciated that the information retained within fixed disk 526, may, in appropriate cases, be incorporated in standard fashion as virtual memory in memory 524. Removable disk 514 may take the form of any of the computer-readable media described below.

CPU 522 is also coupled to a variety of input/output devices such as display 504, keyboard 510, mouse 512 and speakers 530. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 522 optionally may be coupled to another computer or telecommunications network using network interface 540. With such a network interface, it is contemplated that the CPU might receive information from the network, or might output information to the network in the course of performing the above-described method steps. Furthermore, method embodiments of the present invention may execute solely upon CPU 522 or may execute over a network such as the Internet in conjunction with a remote CPU that shares a portion of the processing.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

What is claimed is:

1. A method of comparing sample audio files with each of a plurality of audio files stored in a database system, and classifying the plurality of audio files based on the comparing, the method comprising:

receiving, via a network interface, a first audio signal;

creating, using a processor, a first Gabor representation of the first audio signal of the plurality of audio files stored in a storage location of at least one storage device of the database system;

aligning, using the processor, the first Gabor representation with an existing second Gabor representation of a second audio signal of the plurality of audio files, the aligning being based on a comparison between a plurality of Gabor vectors of the first Gabor representation with a plurality of Gabor vectors included in the second Gabor representation;

executing, using the processor, a similarity scan between the first Gabor representation and the second Gabor representation, the similarity scan using a running window to compare a chain of Gabor vectors included in a first block of the first Gabor representation with corresponding chains of Gabor vectors included in blocks of the second Gabor representation, the corresponding chains of Gabor vectors being identified and compared based, at least in part, on a correspondence map generated during the aligning;

obtaining, using the processor, similarity-related data resulting from the similarity scan, the similarity-related data being stored in a memory device coupled to the processor;

analyzing, using the processor, similarity-related data to determine degrees of similarity between the first audio signal and the second audio signal;

storing a representation of the degrees of similarity at the storage location of the at least one storage device associated with the plurality of audio files; and classifying at least the first audio signal based, at least in part, on the degrees of similarity.

2. A method as recited in claim 1 wherein creating a first Gabor representation of a first audio signal further comprises:

executing a Gabor transformation on the first audio signal thereby producing a plurality of audio signals;

creating a plurality of Gabor vectors from the plurality of audio signals; and determining similarity between each of the vectors in the plurality of Gabor vectors and Gabor vectors from a second audio signal.

3. A method as recited in claim 1 wherein aligning the first Gabor representation further comprises:

creating multiple blocks from a first Gabor spectrogram, each block having multiple Gabor vectors,
wherein the running window is from a second Gabor spectrogram.

4. A method as recited in claim 3 further comprising:
deriving a first similarity from the comparison; and
aggregating the first similarity with a plurality of similarity values thereby creating an aggregated similarity for the block.

5. A method as recited in claim 1 wherein analyzing similarity-related data further comprises:
classifying the first audio signal as duplicate, near duplicate, and not duplicate with respect to the second audio signal.

6. A method as recited in claim 1 further comprising:
breaking the first audio signal into multiple blocks, a block having a plurality of Gabor vectors.

7. A method as recited in claim 1 further comprising:
determining where a block has the highest similarity in the second audio signal at a specific time; and
storing a similarity value representing this highest similarity.

8. A method as recited in claim 1 further comprising:
determining an offset between two audio signals based on where the highest number of same similarities are, wherein similarity may be low but if multiple blocks have the same offset, then using the offset for alignment.

9. A method as recited in claim 1 wherein similarity-related data includes average similarity, maximum similarity, minimum similarity, similarity standard deviation, entropy related to aggregate similarity value.

10. A method as recited in claim 1 further comprising:
storing the aggregate similarity value; and creating a histogram of similarity values.

11. A method of aligning a plurality of sample audio files and a plurality of audio files stored in a database system, and classifying the plurality of audio files, the method comprising:
receiving, via a network interface, a first audio file and a second audio file;
creating, using a processor, a first Gabor spectrogram of the first audio file and a second Gabor spectrogram of the second audio file;
breaking, using the processor, the first spectrogram into a plurality of blocks, each block including a chain of Gabor vectors;
creating, using the processor, a running window of Gabor vectors for the second spectrogram, the number of Gabor vectors being the same as the number of Gabor vectors in each block;
comparing, using the processor, a Gabor vector from the chain of Gabor vectors of a first block of the first Gabor spectrogram to a corresponding Gabor vector included in a second block of the running window associated with the second Gabor spectrogram, the corresponding chains of Gabor vectors being identified and compared based, at least in part, on a correspondence map;
storing, using the processor, similarities from comparisons in a memory device coupled with the processor;
creating, using the processor, a plurality of aggregate similarities from the similarities;
deriving, using the processor, a plurality of offsets from the plurality of aggregate similarities;
determining, using the processor, a best offset based on a peak of a histogram of the plurality of offsets; and
classifying at least the first audio file based, at least in part, on the similarities.

12. A method as recited in claim 11 further comprising:
utilizing the best offset to align the first spectrogram and the second spectrogram.

* * * * *